June 4, 1946.  G. L. BENSON  2,401,539
SEAL
Filed Dec. 20, 1943

INVENTOR.
GERALD L. BENSON
BY Kwis Hudson Boughton & Williams
ATTORNEYS

Patented June 4, 1946

2,401,539

UNITED STATES PATENT OFFICE 2,401,539

SEAL

Gerald L. Benson, Lodi, Ohio

Application December 20, 1943, Serial No. 514,900

2 Claims. (Cl. 288—3)

This invention relates to seals and particularly to shaft type seals adaptable for certain installations wherein the shaft is stationary and the hub of the wheel rotates and for other installations wherein the shaft rotates in a stationary housing or equivalent member or has a reciprocating motion or a combined reciprocating and rotary motion or an oscillatory motion.

The principal object of the invention is to provide a shaft type seal which effectively prevents the escape of lubricant, such as oil or grease, and the entrance of dirt, and which has long life.

A further object is to provide a seal which is easy to install, there being no lip to fold back, no metallic spring or other metallic device which may be fouled with dirt or become rusty, and wherein the sealing surface is held in position and cannot be displaced during or after installation.

A further object is to provide a seal adapted for use on tanks, trucks, transmissions, etc., regardless of whether the shaft or hub rotates and, in fact, to provide a seal which may be used in any place where a seal of this type is used at the present time.

The invention may be further briefly summarized as consisting in certain novel details of construction and combinations and arrangements of parts which will be described in the specification and set forth in the appended claims.

In the accompanying sheet of drawings showing one form of my invention,

Figure 1:
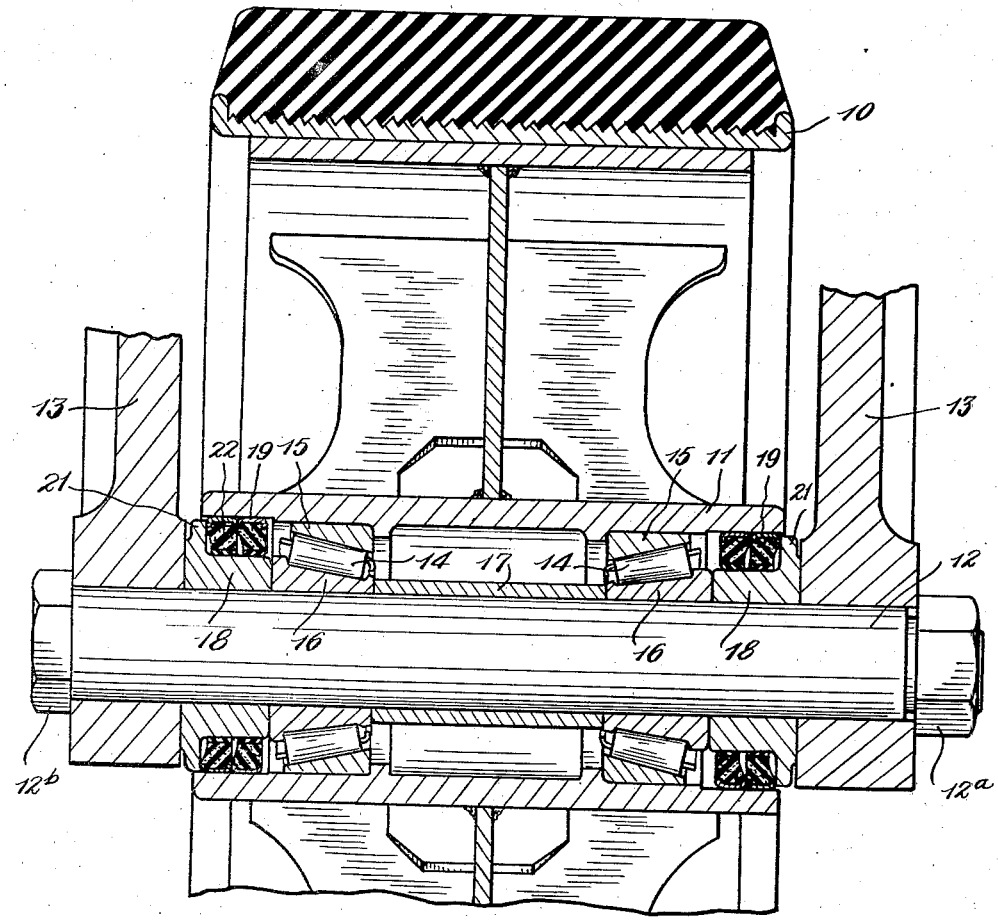
Fig. 1 is a partial sectional view showing my improved shaft type seal applied to a bogey wheel construction for use on tanks.
Figure 2:
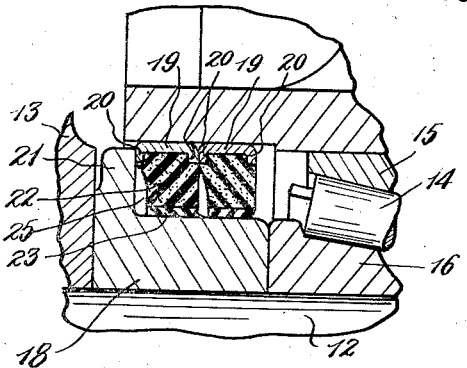
Fig. 2 is an enlarged fragmentary sectional view of the same.

In the drawing I have illustrated my invention applied to the bogey wheel of a tank. In Fig. 1 of the drawing I show the bogey wheel at 10, the bogey wheel having a hub 11 which is mounted upon a non-rotating gudgeon pin (or shaft) 12 which is supported by gudgeon pin arms 13. The bogey wheel hub 11 is supported on the gudgeon pin 12 by a pair of roller bearings 14 which include bearing races or cups 15 having a forced fit in the hub 11 of the bogey wheel and bearing cones 16 having a sliding fit on the gudgeon pin 12. If desired, ball bearings may be employed instead of the roller bearings 14. Between the two bearing cones 16 is a bearing spacer 17, and on the outer sides of the bearing cones 16, next to the gudgeon pin arms 13, are a pair of adapters 18 which preferably have a sliding fit on the gudgeon pin 12. In this instance each adapter 18 is provided with a radial flange 21 which serves as a protection for the adjacent outer seal.

Coming now to my improved seal, I provide between the outer ends of the hub 11 of the bogey wheel and each adapter 18 on the outer sides of the roller bearings 14 two of my improved seals arranged side by side, but I do not desire to be confined to the use of two seals on the outer side of each roller (or ball) bearing 14 for, in some instances, a single seal will be sufficient or more than two seals may be employed if desired.

Figure 3:
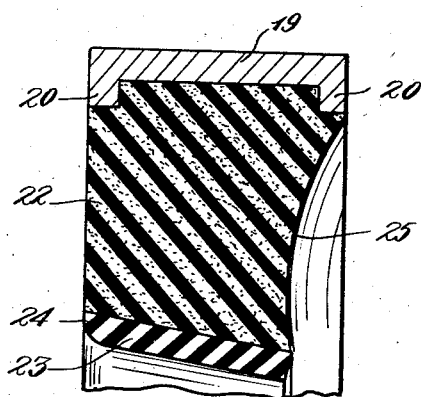
Fig. 3 is a sectional view, on an enlarged scale, of the seal, showing the preferred construction before the seal is applied.

Referring to Fig. 3 of the drawing, it will be seen that each seal includes an annular supporting ring or cage 19 which in this instance has a pair of inwardly turned flanges 20, the supporting ring having a forced fit in the hub of the bogey wheel. The supporting ring 19 of each seal carries an annular body or ring 22 of yieldable synthetic rubber sponge, preferably neoprene sponge, and on the inner annular face of the sponge ring 22 is secured a sealing sleeve or annulus 23 of solid but yieldable material such as synthetic rubber or yieldable plastic. At present I am using a synthetic rubber known as Hycar. The outer annular face of the ring of sponge 22 is bonded to the inner face of the supporting ring 19 and the sealing ring 23 is bonded to the inner face of the sponge ring 22, the bonding being preferably produced by vulcanization of the parts together, although, in some instances, the parts may be cemented together. It will be noted that the sponge ring engages the inner face of the supporting ring 19 and the inner sides of the flanges 20 of the supporting ring and extends inwardly into engagement with the solid but yieldable ring 23.

It is to be noted also that the sponge ring 22 varies in thickness from the inner part of the seal to the outer part thereof, its inner surface being on a gradual taper. It will be seen also that the sealing ring 23 is also on a taper, which taper conforms to the inner periphery of the sponge ring, the part of smaller diameter being toward the outer part of the seal. Additionally, the outer part of the sponge ring 22 is somewhat wider than the inner part thereof and than the sealing ring 23, and the side of the sponge ring is curved inwardly from the outer flange 20 of the supporting ring 19 and then slightly outwardly to the sealing ring 23, as shown at 25.

In the installation of the seals in the hub, the bearings and spacer are first applied to the hub, then the seals are applied to the adapters, and then the seals and the adapters are installed in the hub, the supporting rings 19 of the seals being of suitable size to provide what is known as a forced fit in the hub. Then the bogey wheel, seals and bearing assembly is installed on the tank between the bogey wheel gudgeon pin arms, then the gudgeon pin 12 is inserted, and the gudgeon pin nut 12a is applied and properly tightened, the nut being secured to the pin by a cotter pin, not shown. It is to be understood that the pin has a head 12b on the end opposite the nut 12a, and by tightening the nut the whole assembly is held tightly in position so that the bogey wheel may perform its function of supporting and carrying the vehicle. The seals are applied so that the ends of the sealing rings of smaller diameter are on the outer sides of the seals. However, in some instances the seals may be otherwise arranged, as, for example, the inner sealing ring 23 may be reversed in position, that is to say, the part of smaller diameter may be on the inner side. When the adapters 18 are applied, the sealing rings engage the cylindrical surfaces of the adapters, stretching the sealing rings at their outer sides and also to some extent compressing the sponge rings 22. Thus the sealing rings engage the adapters with somewhat greater pressure at the outer sides of the seals. This is provided in order that a sufficient amount of oil or grease may work its way from the inner side of the seal to the outer side to serve as lubrication for the sealing ring of the outer seal, the radius 24 at the inner side of the sealing ring facilitating this action.

Thus it will be seen that the objects stated in the early part of the specification are attained very effectively by my improved seal. With the seals mounted as illustrated, the seals rotate with the hub with the sealing rings 23 yieldingly engaging the adapters and forming the sealing surfaces.

An important advantage of my improved seal lies in the fact that the absorption of lubricant, such as oil or grease, by the sponge rings 22 causes the latter to expand and thus maintain a substantially uniform pressure between the sealing rings and the adapters which in effect become parts of the shaft 12, thus compensating for any wear that may take place on the sealing rings or adapters.

With the arrangement illustrated, the sealing action of course takes place between the adapters and the sealing rings. The seals may, however, be reversed in position so that the supporting rings 19 are forced onto the adapters and the sealing rings 23 engage the rotating hub or equivalent device. In some constructions, the sealing rings may engage directly the gudgeon pin or shaft 12 instead of the adapters, that is to say, the seals may be located directly between the shaft and the hub structure surrounding the shaft regardless of whether the sealing rings 23 engage the shaft or the hub structure. As a matter of fact, the seal may be employed in any construction either on a rotating or reciprocating or oscillating shaft to keep in the grease or oil and to keep the dirt out of the construction which surrounds the shaft.

While I have shown the preferred construction only, I do not desire to be confined to the precise details shown and described, but aim in my claims to cover all modifications which do not involve a departure from the spirit and the scope of the invention.

Having thus described my invention, I claim:

1. A seal of the character described for use between relatively rotatable coaxial hub and shaft members, comprising a supporting ring having an annular recess therein and relatively short radial flanges defining the side walls of said recess, a ring of rubber-like sponge material adapted to be subjected to substantially radial compression between said members and having inner and outer peripheries one of which is coextensive with and bonded to the recessed side of said supporting ring and the other of which is axially tapered when said radial compression is removed, and a solid but yieldable sealing ring of rubber-like material bonded to the tapered periphery of said sponge ring and adapted to be sealingly pressed against one of said members by the radial compression of the sponge ring, said sealing ring being also axially tapered so that one end thereof will be pressed against the adjacent one of said members with a higher unit pressure than its other end.

2. A seal of the character described for use between relatively rotatable coaxial hub and shaft members, comprising a supporting ring having an annular recess therein and relatively short radial flanges defining the side walls of said recess, a ring of rubber-like sponge material adapted to be subjected to substantially radial compression between said members and having inner and outer peripheries one of which is coextensive with and bonded to the recessed side of said supporting ring and the other of which is axially tapered when said radial compression is removed, and a solid but yieldable sealing ring of rubber-like material bonded to the tapered periphery of said sponge ring and adapted to be sealingly pressed against one of said members by the radial compression of the sponge ring, said sealing ring being also axially tapered so that one end thereof will be pressed against the adjacent one of said members with a higher unit pressure than its other end and the radial face of the sponge ring which is adjacent the higher unit pressure end of said sealing ring having a concave annular recess therein.

GERALD L. BENSON.